UNITED STATES PATENT OFFICE.

FREDERICK HERBERT GOSSAGE, OF WIDNES, COUNTY OF LANCASTER, ENGLAND, ASSIGNOR OF ONE-HALF TO THOMAS TRAIN MATHIESEN, OF SAME PLACE.

PROCESS OF MAKING SODA.

SPECIFICATION forming part of Letters Patent No. 401,699, dated April 16, 1889.

Application filed December 4, 1888. Serial No. 292,652. (No specimens.) Patented in England March 2, 1888, No. 3,218.

*To all whom it may concern:*

Be it known that I, FREDERICK HERBERT GOSSAGE, manufacturing chemist, a subject of the Queen of Great Britain, residing at Widnes, in the county of Lancaster, England, have invented certain Improvements in the Manufacture of Sulphide of Sodium or of Sulphide of Potassium from their Respective Sulphates, (for which I, in conjunction with THOMAS TRAIN MATHIESEN, of Widnes aforesaid, manufacturing chemist, have made application for a patent and obtained provisional protection therefor in Great Britain, No. 3,218, dated March 2, 1888,) of which the following is a specification.

The object of this invention is to manufacture sulphide of sodium or sulphide of potassium from their respective sulphates without destroying the lining of the furnace in which the reduction is made. According to this invention there is added to a mixture of sulphate of soda or of sulphate of potash and carbonaceous matter a sufficient quantity of chloride of sodium or common salt, the presence of which in the furnace during the process of reduction prevents the injurious action of the sulphide upon the lining of the furnace. I do not limit myself to any precise proportion of such common salt, but generally I find that eight parts, by weight, of such salt to every twenty parts, by weight, of the sulphate is sufficient.

The mixture of sulphide and common salt formed by the fusion of the charge in the furnace may be drawn from the furnace into open vessels and cooled before lixiviation without danger of oxidation. The mixture is then lixiviated, and a solution obtained of the strength requisite to yield crystals of sulphide of sodium or of sulphide of potassium, as the case may be. A solution of these crystals or the liquor obtained by lixiviation, as aforesaid, is suited for the obtainment of bicarbonate of soda or of potash by the process wherein the sulphide is mixed with a solution of a corresponding chloride or sulphate, and the mixture is heated with carbonic-acid gas.

I claim—

1. The improvement in the manufacture of sulphide of sodium or sulphide of potassium which consists in adding to a mixture of sulphate of soda or sulphate of potash and carbonaceous matter a quantity of sodium or common salt, in about the proportion of eight parts, by weight, of such salt to every twenty parts, by weight, of the sulphate during reduction.

2. In the manufacture of sulphide of sodium or sulphide of potassium, adding to a mixture of sulphate of soda or sulphate of potash and carbonaceous matter a quantity of sodium or common salt, in about the proportion of eight parts, by weight, of such salt to every twenty parts, by weight, of the sulphate during reduction, the mixture after cooling then being lixiviated.

3. In the manufacture of sulphide of sodium or sulphide of potassium, adding to a mixture of sulphate of soda or sulphate of potash and carbonaceous matter a quantity of sodium or common salt, in about the proportion of eight parts, by weight, of such salt to every twenty parts, by weight, of the sulphate during reduction, the mixture after cooling then being lixiviated, and after this, in order to obtain bicarbonate of soda, mixing with the sulphide a solution of a corresponding chloride or sulphate, the whole then being subjected to the action of carbonic-acid gas.

In testimony whereof I have signed my name to this specification in the presence of two subscribing witnesses.

FREDERICK HERBERT GOSSAGE.

Witnesses:
ROBERT COOKE,
*Clarendon Road, Garston, Book-Keeper.*
ALEXANDER THORPE,
*Penketh, Warrington, Buyer.*